US012572685B2

(12) United States Patent
Truong et al.

(10) Patent No.: US 12,572,685 B2
(45) Date of Patent: Mar. 10, 2026

(54) CONTEXT-BASED PATTERN MATCHING FOR SENSITIVE DATA DETECTION

(71) Applicant: Capital One Services, LLC, McLean, VA (US)

(72) Inventors: Anh Truong, Champaign, IL (US); Jeremy Goodsitt, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 555 days.

(21) Appl. No.: 17/849,439

(22) Filed: Jun. 24, 2022

(65) Prior Publication Data

US 2023/0418971 A1     Dec. 28, 2023

(51) Int. Cl.
| | |
|---|---|
| *G06F 21/62* | (2013.01) |
| *G06F 40/284* | (2020.01) |
| *G06F 40/289* | (2020.01) |
| *G06N 3/02* | (2006.01) |
| *G06N 20/00* | (2019.01) |

(52) U.S. Cl.
CPC ........... *G06F 21/6245* (2013.01); *G06N 3/02* (2013.01); *G06N 20/00* (2019.01); *G06F 40/284* (2020.01); *G06F 40/289* (2020.01)

(58) Field of Classification Search
CPC .......... G06N 3/02; G06N 3/084; G06N 20/00; G06N 40/279; G06N 40/284; G06N 40/289; G06N 40/295; G06F 21/6245
See application file for complete search history.

(56) References Cited

U.S. PATENT DOCUMENTS

| | | | | |
|---|---|---|---|---|
| 6,411,952 | B1* | 6/2002 | Bharat .................. | G06F 16/951 |
| | | | | 707/999.005 |
| 9,330,258 | B1* | 5/2016 | Satish ................. | H04L 63/1441 |
| 10,878,124 | B1* | 12/2020 | Sitaraman ........... | G06F 21/6245 |
| 10,956,522 | B1* | 3/2021 | Jha ......................... | G06F 16/355 |
| 2008/0033953 | A1* | 2/2008 | Vaithyanathan ...... | G06F 16/353 |
| | | | | 707/999.009 |
| 2017/0261403 | A1* | 9/2017 | Hiruta ................ | G05B 23/0216 |
| 2018/0225568 | A1* | 8/2018 | Chandramouli ......... | G06N 3/04 |
| 2018/0285599 | A1* | 10/2018 | Praveen .................. | G06F 18/22 |
| 2020/0336501 | A1* | 10/2020 | Lewis ................. | G06F 21/6263 |
| 2021/0056099 | A1* | 2/2021 | Goodsitt ................ | G06N 20/00 |
| 2021/0241331 | A1* | 8/2021 | Katzenelson ........... | G06F 40/20 |
| 2021/0366099 | A1* | 11/2021 | Liao ....................... | G06F 40/216 |
| 2022/0092086 | A1* | 3/2022 | Tumpic .............. | G06F 16/2468 |
| 2022/0164325 | A1* | 5/2022 | He ......................... | G06F 16/221 |

(Continued)

*Primary Examiner* — Jeremy S Duffield

(74) *Attorney, Agent, or Firm* — Foley & Lardner LLP

(57) ABSTRACT

A method includes generating first patterns indicating a data label and associating a candidate token of a text sequence with the data label by removing first tokens from the text sequence based on a match of the first tokens with a token of second patterns and selecting the candidate token from other tokens of the text sequence based on a match between the candidate token and a token of the second patterns. The method also includes updating a token sequence collection to comprise the candidate token and a context token, updating the second patterns with new patterns that match the candidate token and the context token, and removing a first pattern from the second patterns based on a determination that the first pattern matches with a token sequence associated with the test tokens.

19 Claims, 3 Drawing Sheets

(56)     References Cited

U.S. PATENT DOCUMENTS

| 2022/0292427 | A1* | 9/2022 | Acuff | H04L 51/046 |
| 2023/0046471 | A1* | 2/2023 | Enuka | G06N 20/00 |
| 2023/0214591 | A1* | 7/2023 | Shang | G06F 40/279 |
| | | | | 382/181 |

* cited by examiner

CONTEXT-BASED PATTERN MATCHING FOR SENSITIVE DATA DETECTION

BACKGROUND

A user's sensitive data includes identifying information and information used to access the user's tangible or intangible assets. Sensitive data is frequently requested and provided in forms, emails, or other methods of communication. However, many uses of this provided information do not require such sensitive data. Furthermore, various machine learning optimization operations or quantitative operations may require removing sensitive information from a dataset in order to protect a user's rights.

SUMMARY

Various optimization operations and user-facing applications may analyze data from real-world users. However, privacy and cybersecurity concerns can create obstacles to the goals of accurately studying sensitive data, such as email addresses, phone numbers, names, or other types of user identifying information. The evolving definitions for sensitive data and the different formats associated with sensitive information drive the development of robust rules-based systems that accurately capture sensitive information. For example, a system may include a rule that captures email addresses based on a regular expression ("regex") pattern. However, an email address may be overlooked by a rule if an email address does not match the rule's regular expression pattern due to a misspelling or a variation in an email server.

Some embodiments may obtain inclusive regex patterns based on sensitive tokens associated with a sensitive data label, where each pattern of the inclusive regex patterns matches with at least one token of the sensitive tokens. The inclusive regex pattern may represent patterns known to match sensitive data. Some embodiments may first determine that some tokens are not sensitive based on exclusive regex patterns to account for training data, artifacts, and similarities with non-sensitive data. After removing a subset of tokens from a document from consideration using the exclusive regex patterns, some embodiments may associate a candidate token of a document with a sensitive data label. For example, some embodiments may label a candidate token as sensitive based on a determination that the candidate token matches with a pattern of the inclusive regex patterns.

A rules-based system that uses text search patterns may fail to account for changes in context that determine whether the candidate token is sensitive, non-sensitive, or should be assigned another data label. However, the effective use of the context of a candidate token to determine data labels may be contingent on systems that accurately capture rapid changes in the rules established by the context of a token. In many cases, a word, number sequence, or other string that is not considered sensitive in one week may be considered sensitive in the next week due to the context of the word, number sequence, or other string. Some embodiments may account for these changes by updating the patterns and training data used to generate patterns to include or account for context in response to receiving a feedback message from one or more client-side computing devices indicating mislabeling. Such mislabeling indicators may indicate that a candidate token has been incorrectly associated with a sensitive data label. Some embodiments may then generate a set of additional token sequences, where each token sequence may include a set of context tokens surrounding one or more candidate tokens indicated as mislabeled.

Some embodiments may use these additional sequences to generate new patterns, such as by using regex-generating packages, neural networks, other machine learning models, etc. The generated patterns may match the additional sequences. In many cases, to increase accuracy and reliability, some embodiments may require that each generated pattern matches with token sequences of a token sequence collection at least a threshold count of times. Furthermore, some embodiments may prune one or more generated patterns, such as one or more generated regex patterns. For example, some embodiments may determine that a generated exclusive pattern matches with a token sequence indicated as sensitive and, in response, remove the generated exclusive pattern from a list of sensitive patterns.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise. Furthermore, a "set" may refer to a singular form or a plural form, such as that a "set of items" may refer to one item or a plurality of items.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
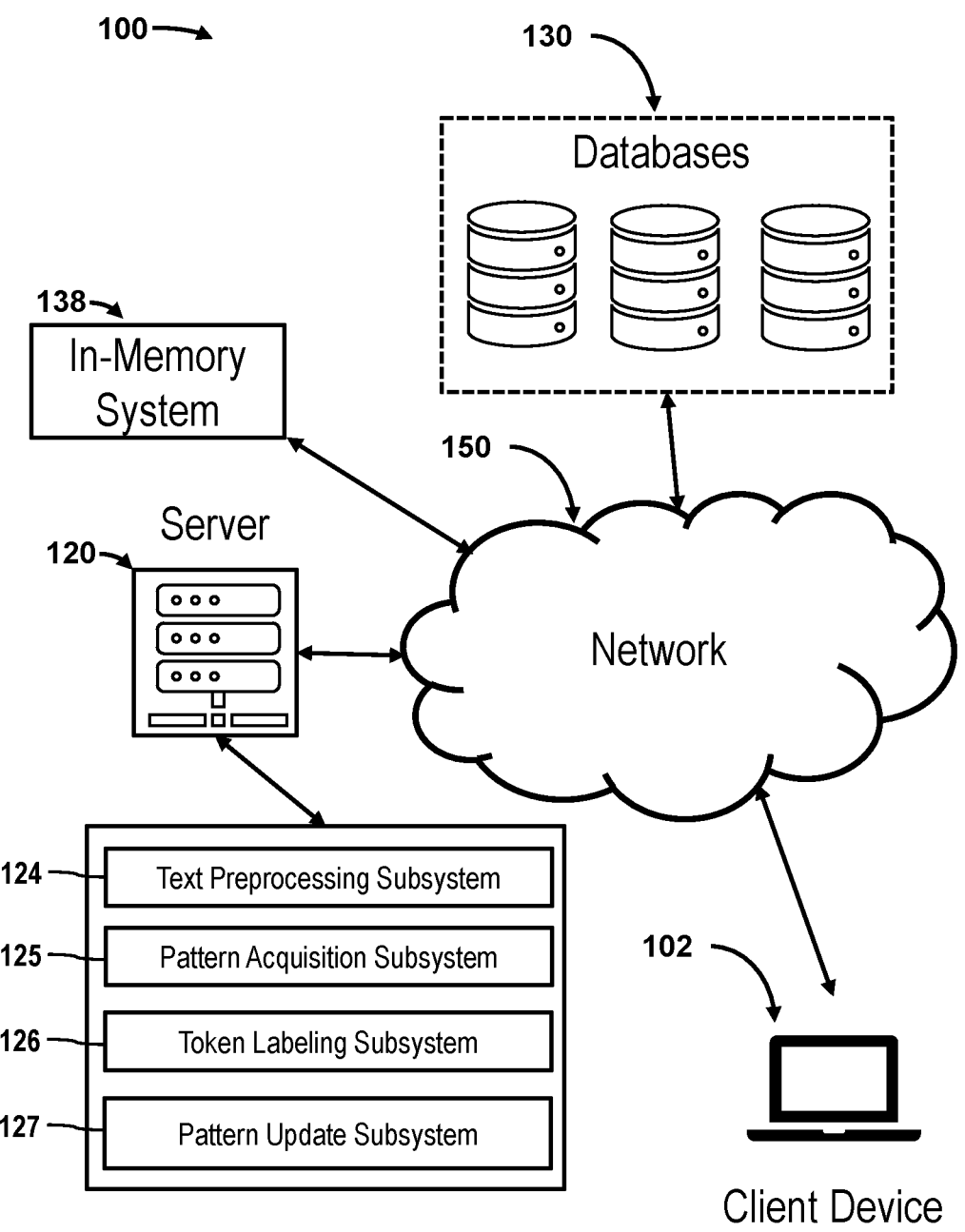
FIG. 1 shows an illustrative system for detecting sensitive data using patterns, in accordance with one or more embodiments.

FIG. 1 shows an illustrative system for detecting sensitive data using patterns, in accordance with one or more embodiments. A system 100 includes a client computing device 102. While shown as a laptop computer, it should be noted that the client computing device 102 may include other types of computing devices such as a desktop computer, a wearable headset, a smartwatch, another type of mobile computing device, etc. In some embodiments, the client computing device 102 may communicate with various other computing devices via a network 150, where the network 150 may include the Internet, a local area network, a peer-to-peer network, etc.

The client computing device 102 may send and receive messages through the network 150 to communicate with a server 120, where the server 120 may include non-transitory storage medium storing program instructions to perform one or more operations of subsystems 124-127. A user may access a test environment executing on the server 120 from the client computing device 102 via the network 150. Further, while one or more operations are described herein as being performed by particular components of the system 100, those operations may be performed by other components of the system 100 in some embodiments. One or more operations described in this disclosure as being performed by the server 120 may instead be performed by the client computing device 102. For example, the client computing device 102 may execute an application to use and update patterns described in this disclosure, where a memory of the client computing device 102 may be used to store program instructions for the application, patterns, test data or other data described in this disclosure. Furthermore, although some embodiments are described herein with respect to machine learning models, other prediction models (e.g., a probabilistic model) may be used instead of or in addition to the machine learning models. For example, a probabilistic model may be used to replace a neural network model in one or more embodiments to determine patterns associated with a data label. Furthermore, some embodiments may communicate with an API of a third-party data service via the network 150 to perform some operations of an application being tested, obtain externally-stored rules, use validation services, or use other services that perform one or more operations described in this disclosure.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include various values used to perform operations described in this disclosure, such as test data, machine learning model parameters, documents, token sequences, text preprocessing parameters, learning model training data, learning model parameters, or other values used in this disclosure, etc. For example, records of the set of databases 130 may include rule results of an application and an indication that an application was deployed to a production environment from a test environment. In addition, the client computing device 102 or the server 120 may access data stored in an in-memory system 138, where the in-memory system 138 may include an in-memory data store that stores data in a key-value data store such as Redis™. Some embodiments may store learning model parameters, rule results, or other data in an in-memory data store to accelerate data retrieval or learning model operations.

Subsystems 124-127

In some embodiments, the text preprocessing subsystem 124 may obtain a document from a data source, such as the set of databases 130. Some embodiments may perform OCR conversion on the document to convert writing or graphical entries into a text form. Furthermore, some embodiments may combine text written on a form with an entry for the form. For example, some embodiments may determine that a user interface (UI) element has the title "patient ID" and that a user had entered a numeric value into a text box associated with the UI element. Some embodiments may then indicate an association between the term "patient ID"

and the numeric value, where the association may indicate that the tokens "patient" and "ID" are context tokens of the numeric value.

Some embodiments may use the text preprocessing subsystem 124 to generate a set of tokens from the text of the document. In some embodiments, a token may be an unchanged string or part of a string of a document. For example, if a document included the phrase, "the dog pontificated," some embodiments may use the text preprocessing subsystem 124 to generate the tokens "the," "dog," and "pontificated." Alternatively, some embodiments may generate tokens that include sub-words based on the one or more words. For example, if a document included the sentence "the blue dog pontificated," some embodiments may use the text preprocessing subsystem 124 to generate the tokens "blue," "dog," "pontif," and "icated." Furthermore, some embodiments may use a machine learning model to generate vectors based on the tokens. For example, some embodiments may use a trained autoencoder to generate embedding vectors based on the tokens generated from text.

Some embodiments may convert images, or a combination of images and text, into a text format. Some embodiments may analyze the images and determine that a set of tokens are within proximity of each other based on their orientation and distance with respect to each other. For example, some embodiments may determine that a first word and a second word are within a proximity threshold of each other and that the orientation of the first word relative to the second word is in the same sequence or otherwise are context tokens with respect to each other. Some embodiments may vary the orientations used to determine whether words are in the same sequence or should otherwise be context tokens with respect to each other. Some embodiments may obtain form-specific or language-specific templates to indicate specific proximity thresholds or orientation directions that indicate that a set of tokens are part of the same sequence of tokens and provide an order to the sequence of tokens. Some embodiments may then determine whether a distance between tokens in their orientation directions for each respective token satisfies a threshold, where tokens that have a distance less than the threshold may be candidate tokens if the distance is in the orientation direction. For example, some embodiments may retrieve a form-specific template indicating a set of boxes, thresholds, and orientation direction in the set of boxes, where, for each respective box, each token of a set of tokens in the respective box may be candidate tokens with respect to each other based on their distances from each other in the orientation direction assigned to their respective box. Furthermore, the form-specific template may indicate that tokens from different boxes are not part of the same sequence of tokens.

Some embodiments may use a pattern acquisition subsystem 125 to generate a set of patterns, such as regex patterns. As used in this disclosure, a pattern may refer to any sequence of characters, numbers, symbols, or other text that may be used to match with strings. For example, a pattern may include a regex pattern, a Microsoft Word™ wildcard pattern, a regex pattern incorporating functionality from a PERL library, etc. A pattern may also include parsing patterns, such as patterns generated using a pyparsing module or another python module, a pattern generated using a context-free grammar encoded in a JSON or BSON file, etc. Some embodiments may generate a set of patterns using a training set obtained from a training database. Alternatively, or in addition, some embodiments may use the pattern acquisition subsystem 125 to obtain a stored set of patterns.

For example, some embodiments may access a database to obtain a stored set of regex patterns, where the stored set of regex patterns may include a record of general regex patterns that includes the regex pattern "([a-zA-Z]+([a-zA-Z]+)+)."

In some embodiments, different sets of patterns may be used. In some embodiments, a first set of patterns may be used as an exclusive set of patterns, and a second set of the patterns may be used as an inclusive set of patterns. Some embodiments may determine that an exclusive pattern matches with a candidate token and, in response, prevent the candidate token from being associated with one or more pre-determined labels. For example, some embodiments may determine that the text sequence "[000000x001]" matches with an exclusive regex pattern "\[*.\]" and, in response, prevent the text sequence "[000000x001]" from being labeled with the data label "sensitive data." In some embodiments, an initial set of sensitive tokens may be obtained from a set of test tokens, where the set test tokens may include pre-labeled test tokens. In some embodiments, the set of test tokens may include a collection of token sequence that are pre-labeled and may be used to update patterns or machine learning models used to determine patterns as described elsewhere in this disclosure. Furthermore, some embodiments may determine that an inclusive pattern matches with a candidate token and, in response, associate the candidate token from being associated with one or more pre-determined labels. For example, some embodiments may label the sequence of characters "000-000-0001" with a "sensitive" data label based on a determination that the sequence of characters is matched by a regex pattern "([0-9]+(-[0-9]+)+)."

In some embodiments, the token labeling subsystem 126 may be used to indicate that a candidate token is associated with a specified data label, such as a data label indicating that the candidate token is "sensitive data." For example, some embodiments may determine which tokens of a sequence of tokens that include a first token, a second token, and a third token should be labeled with the "sensitive" data label. Some embodiments may apply an exclusive set of patterns and determine that the third token matches an exclusive pattern. In response, some embodiments may remove the third token from consideration for the "sensitive" data label. Some embodiments may then apply an inclusive set of patterns and determine that the first token matches with an inclusive pattern. In response, some embodiments may label the first token with the "sensitive" data label.

As described elsewhere in this disclosure, some embodiments may determine that a token or set of tokens should be associated with a data label based on the set of tokens matching with a first pattern and the context of the tokens matching a second pattern. As used in this disclosure, a primary pattern may describe a pattern that matches a candidate token associated with a data label. Additionally, a context pattern may describe a pattern that matches a context token of the candidate token. For example, some embodiments may encounter the phrase "computer device a537 having identity 43.XXX.519.44 482-3545; unauthorized entry detected." In some embodiments, a surrounding token of a candidate token may be selected as a context token of the candidate token based on a determination that the surrounding token is within a threshold number of tokens of the candidate token. For example, if the threshold number of tokens is three, then, in the token sequence "one two three four five," each of the tokens "two," "three," and "four" may be context tokens of the candidate token "five." Furthermore, some embodiments may select some or all of the tokens that are in a same sentence with the candidate token as context tokens.

Some embodiments may perform a multi-part application of different patterns to determine that a first candidate token "43.XXX.519.44" is sensitive data. For example, some embodiments may detect that the token "a537" and the token "identity" match with first and second context patterns, where the first and second context patterns may indicate the possible presence of sensitive data. Some embodiments may then determine that the first candidate token "43.XXX.519.44" matches with a candidate-matching pattern. Based on a determination that the first context pattern, second context pattern, and candidate-matching patterns match with their corresponding tokens in the phrase, some embodiments may label the candidate token with the "sensitive" data label.

Furthermore, some embodiments using the operations above may further determine that another set of candidate tokens should not be associated with a data label based on context tokens surrounding the other set of candidate tokens. For example, some embodiments may use a rules-based system to determine that a second candidate token "51.XXX.960.32" in the phrase " . . . phrase here is a random word 51.XXX.960.32" is not to be labeled with the "sensitive" data label based on the context tokens "random" and "word" by matching the context tokens with one or more patterns. The rules-based system may determine whether the context tokens of the second candidate token include any corresponding tokens which match with at least one set of context token patterns associated with the "sensitive" data label. Based on a determination that the context tokens include tokens that match with at least one set of context token patterns that is part of a set of exclusive patterns, some embodiments may determine that the second candidate token "51.XXX.960.32" should not be labeled with the "sensitive" data label.

Some embodiments may respond to feedback using the pattern update subsystem 127. Some embodiments may receive feedback from a user, training system, or API indicating that a candidate token has been incorrectly labeled. As used in this disclosure, a set of tokens may be incorrectly labeled if the set of tokens is assigned with a data label that is later determined to be incorrect or if the set of tokens is not assigned with a data label with which the set of tokens should be assigned. Some embodiments may update a collection of token sequences to include a set of context tokens, where a context token may be a token that is within a pre-set token distance from a candidate token, for example, based on a determination that a first candidate token "candidateID10-151" was incorrectly labeled as "not sensitive," where the text from which the first candidate token was obtained included the text sequence "the patient identifier is candidateID10-151." Some embodiments may first generate a plurality of patterns that match the first candidate token, where the plurality of patterns may include the first pattern "[a-zA-Z]+[0-9]+([+-]?(?=\.\d|\d)(?:\d+)?(?:\.?\d*))(?:[eE]([+-]?\d+))?" and the second pattern "[a-zA-Z]+10([+-]?(?=\.d|\d)(?:\d+)?(?:\.?\d*))(?:[eE]([+-]?\d+))?." Some embodiments may store the context tokens "patient" and "identifier" in association with a set of patterns. Some embodiments may store the set of context tokens directly and also generate one or more patterns based on the set of context tokens.

Some embodiments may determine a new pattern using a machine learning model. For example, based on a determination that a plurality of candidate tokens are incorrectly labeled during a training operation, some embodiments may use a machine learning model to determine candidate patterns for use as a set of context patterns or a set of candidate-matching patterns. For example, some embodiments may determine that a candidate token was erroneously not labeled with a "sensitive" label. Some embodiments may determine that a set of candidate-matching patterns that match the candidate token are already matched with an exclusive list indicating that the candidate token should not be labeled with the "sensitive" label. In response, some embodiments may use a deep neural network, recursive neural network, or transformer to identify a set of tokens for a new context pattern that matches with one or more context tokens surrounding the candidate token. Furthermore, some embodiments may update a rules-based system to label a second candidate token with the "sensitive" label based on a determination that the context token of the candidate token matches with the newly generated context pattern.

Figure 2:
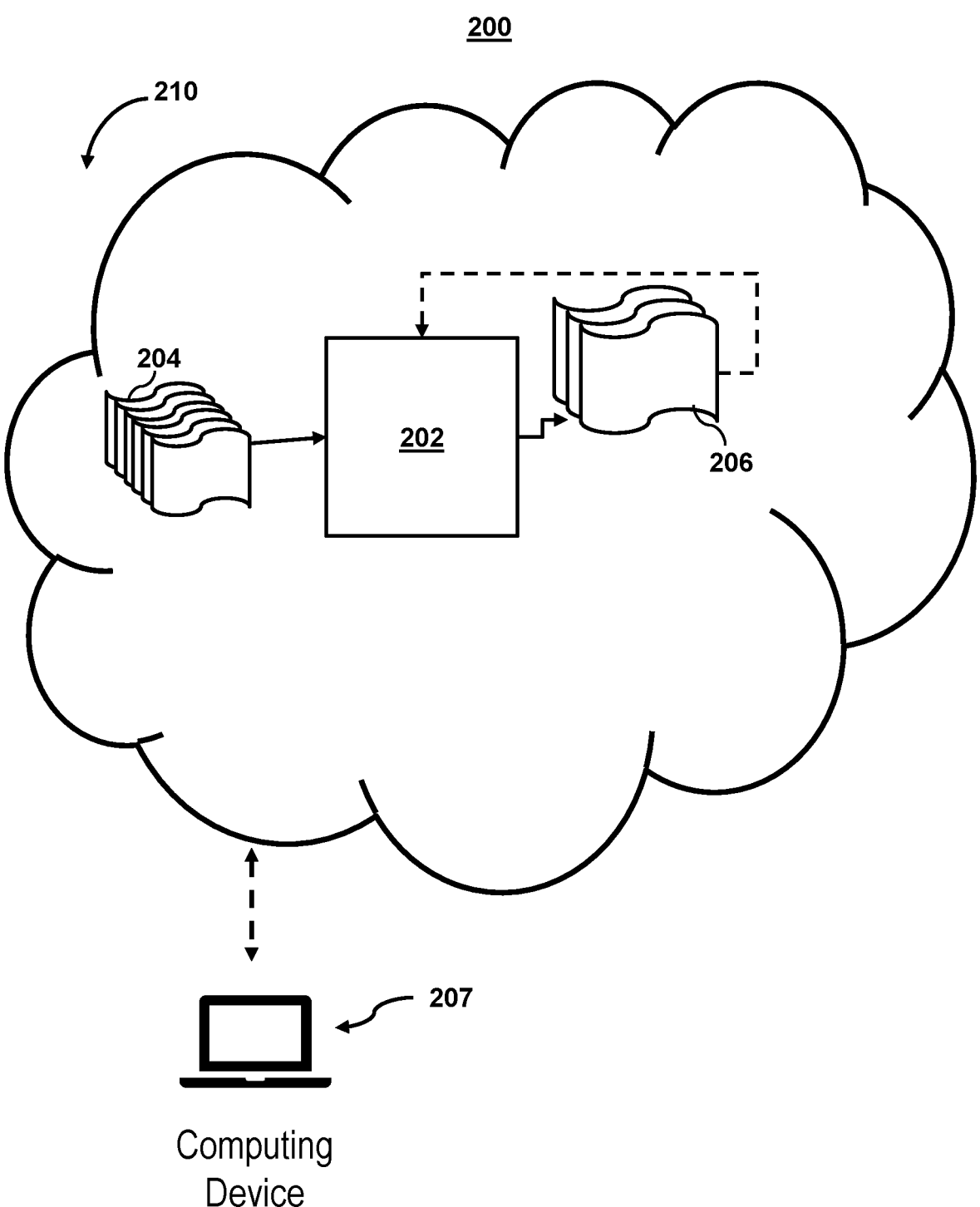
FIG. 2 shows an illustrative diagram of a system for detecting sensitive data using patterns, in accordance with one or more embodiments.

FIG. 2 shows an illustrative diagram of a system for detecting sensitive data using patterns, in accordance with one or more embodiments. A system 200 may include computing device 207, where the computing device 207 may be any computing device, including, but not limited to, a smartphone, a laptop computer, etc. FIG. 2 also includes cloud system 210 implemented on a distributed computer system, where the cloud system 210 may include any computing device described in this disclosure or any other type of mobile computing device, fixed computing device, or another computing device. In some embodiments, the distributed computer system may include a set of computing nodes such as a set of servers or remote computing devices operated by a third party, where the cloud system 210 may include a set of programs or computing services being executed by the distributed computer system. In some embodiments, the cloud system 210 may perform processor operations or data storage operations similar to or the same as those described elsewhere in this disclosure. For example, the cloud system 210 may perform a set of operations performed by the client computing device 102, the server 120, the network 150, or the set of databases 130. The set of databases 130 may each be controlled by different computing nodes of the set of computing nodes, and a query received by the set of databases 130 may cause each node of the set of computing nodes to perform a search based on the query. For example, some embodiments may send a query to the cloud system 210 to retrieve documents and token sequences for using and updating patterns.

In some embodiments, the cloud system 210 may include a machine learning model 202. The machine learning model 202 may take inputs 204 and provide outputs 206. The inputs may include multiple datasets, such as a training dataset and a test dataset. The machine learning model 202 may include a neural network in some embodiments. In such embodiments, machine learning model 202 may include an input layer and a set of hidden layers. Each neural unit of the machine learning model 202 may be connected with many other neural units of the machine learning model 202. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units.

In some embodiments, machine learning model 202 may update its configurations (e.g., weights, biases, or other parameters) based on the outputs 206 and reference feed-back information (e.g., user indication of accuracy, reference vectors, or other information). In some embodiments, such as where machine learning model 202 is a neural network, connection weights may be adjusted to reconcile differences between the neural network's prediction and reference feedback. For example, an output layer of the machine learning model 202 may correspond with a category (e.g., a data label), and a field identifier or field descriptor that is known to correspond with that classification may be provided to an input layer of the machine learning model 202 during training.

In some embodiments, machine learning model 202 may include multiple layers (e.g., where a signal path traverses from front layers to back layers). In some embodiments, the machine learning model 202 may use backpropagation techniques, where forward stimulation is used to reset weights on the "front" neural units. For example, one or more neurons (or cells) of the neural network may require that their respective errors are sent backward through the neural network to facilitate the update process (e.g., backpropagation of error). Updates to the connection weights may be correlated with the magnitude of error propagated backward after a forward pass has been completed, where such updates use various optimization techniques such as simulated annealing or gradient descent. In this way, for example, the machine learning model 202 may be trained to generate better predictions. In some embodiments, stimulation and inhibition operations for the machine learning model 202 may be more free-flowing, with connections interacting in a more chaotic and complex fashion.

Multiple machine learning models may be used and implemented to obtain different types of results. Some embodiments may use a machine learning model to generate new patterns based on inclusive patterns or exclusive patterns. For example, some embodiments may generate a set of generated patterns as part of the outputs 206 using the machine learning model 202 based on input token sequences. Some embodiments may parse the token sequences to an intermediate form of elements, where the elements may include the words, sub-words, vector representations of the words, vector representations of the sub-words, etc. Some embodiments may then use a neural network to select a set of appropriate patterns or sub-patterns that match words or sub-words based on the elements. The neural network used to determine patterns may include a long-short-term-memory (LSTM) neural network, a transformer neural network, or another type of neural network. Alternatively, or in addition, some embodiments may obtain a document from a database and determine whether candidate tokens of the document should be labeled with one or more data labels using another type of machine learning model. Some embodiments may use a weak supervision method to train a machine learning model to label a token or token sequence. For example, some embodiments may use a boosted random forest model (e.g., a random forest model implemented with XGBoost or another boosting technique) to label a token sequence that includes both primary tokens and context tokens by building an aggregate of weak learners. Alternatively, or in addition, some embodiments may train and use other ensemble learning models based on a weak supervision method. In cases where the document is obtained from a training set, some embodiments may compare the output labels with the training data output labels and update one or more parameters of the machine learning model 202.

In some embodiments, outputs 206 may be fed back to the machine learning model 202 as input to train the machine learning model 202. For example, the outputs 206 may be used to determine inclusive or exclusive patterns. An indication that a generated pattern does not actually match an input token sequence or a related set of token sequences may cause some embodiments to re-train the machine learning model 202 and update the associated learning model parameters of the machine learning model 202. In some cases, updating the machine learning model may include modifying the internal weights associated with context tokens or intermediate elements generated from context tokens. For example, some embodiments may generate a regex pattern based on a first token sequence and receive feedback indicating that a second token sequence that is indicated as being related to the first token sequence does not match the regex pattern. In response, some embodiments may re-train the neural network used to generate the regex pattern such that the value of the weights of neural network nodes associated with context tokens of the input token sequences are increased.

Figure 3:
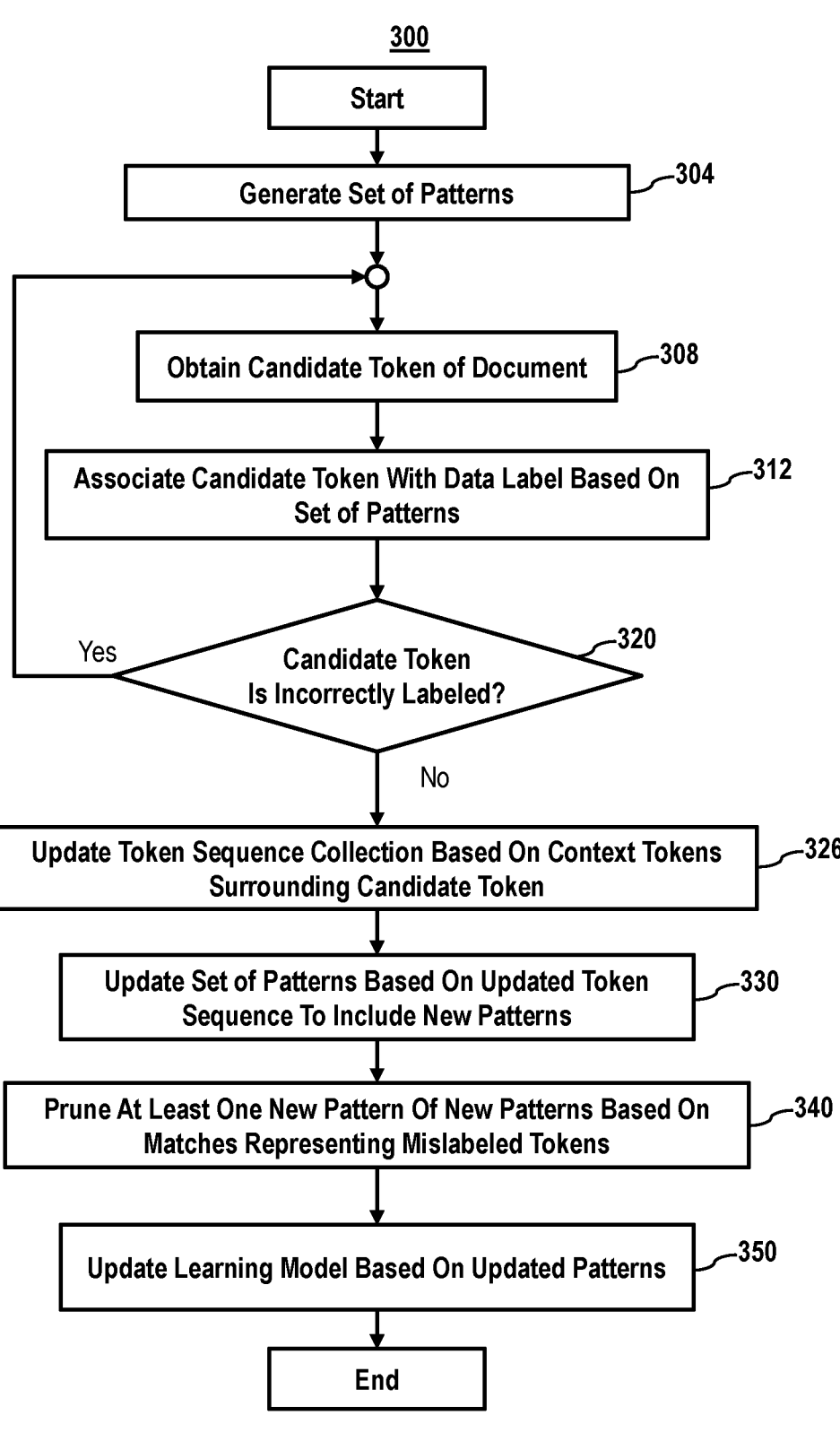
FIG. 3 shows a flowchart of a process to use and update patterns for determining data labels, in accordance with one or more embodiments.

FIG. 3 shows a flowchart of a process to use and update patterns for determining data labels, in accordance with one or more embodiments. Some embodiments may generate a set of patterns, as indicated by block 304. Some embodiments may generate a set of patterns for different uses of a multistage application of the patterns, where the set of patterns may include text-matching patterns. For example, some embodiments may generate a set of inclusive regex patterns or a set of exclusive regex patterns, where the regex patterns may include context patterns or candidate-matching patterns. Some embodiments may generate an inclusive pattern associated with a data label. As described elsewhere in this disclosure, some embodiments may indicate that a first set of candidate tokens matching the inclusive pattern should be labeled with the data label. Alternatively, some embodiments may determine that a candidate token matching the inclusive pattern should be labeled with the data label if other criteria are satisfied. In some embodiments, the other criteria may include criteria that a context pattern associated with the data label matches with a context token of the candidate token. Furthermore, as described elsewhere in this disclosure, some embodiments may generate an exclusive pattern associated with a first data label. Some embodiments may determine that a second set of candidate tokens match the exclusive pattern and should not be labeled with the first data label. Some embodiments may instead label the second set of candidate tokens with a second data label that is mutually exclusive with the first data label.

Some embodiments may generate patterns using a machine learning model trained with a set of training token sequences. For example, some embodiments may use a text generation model to generate a plurality of new regex patterns based on a set of candidate tokens and context tokens of a training token sequence. Some embodiments may then prune a subset of the regex patterns associated with a data label based on a determination that token sequences indicated as not labeled with the data label still match with the one or more patterns of the subset of the regex patterns. For example, some embodiments may generate an inclusive regex pattern for a plurality of inclusive regex patterns based on a first set of training data. Some embodiments may then determine that the first regex pattern matches a first candidate token associated with the data label despite receiving feedback indicating that the first candidate token is not associated with the data label. The feedback thus indicates that the first regex pattern has incorrectly labeled the first candidate token. In response, some embodiments may remove the first regex pattern from the plurality of inclusive regex patterns.

Some embodiments may perform similar operations for generated patterns corresponding with exclusive patterns. For example, some embodiments may generate an exclusive regex pattern for a plurality of exclusive regex patterns based on a second set of training data. Some embodiments may then determine that the second regex pattern matches a second candidate token indicated as not being associated with a data label despite receiving feedback indicating that the second candidate token is associated with the data label. The feedback thus indicates that the second regex pattern has incorrectly labeled the second candidate token. In response, some embodiments may remove the second regex pattern from the plurality of exclusive regex patterns.

Some embodiments may generate a regex pattern using machine learning models including transformers or autoencoders. For example, some embodiments may convert tokens into embedding vectors of an embedding space using a set of autoencoders. Some embodiments may then use the vector representations of the tokens as inputs to a neural network, such as a transformer neural network, where some embodiments may then use outputs of the neural network to determine a candidate-matching pattern or a context pattern.

Some embodiments may obtain a candidate token of a document, as indicated by block 308. For example, some embodiments may obtain documents from a training data set to obtain one or more documents. Some embodiments may then perform preprocessing operations on the document, where the preprocessing operations may include removing stopwords from the document, lemmatizing the document, rooting the document, etc. Alternatively, some embodiments may use the strings of a document as tokens without altering the words.

After determining a set of candidate tokens, some embodiments may select a sequence of tokens positioned before or after the set of candidate tokens for use as context tokens of the set of candidate tokens. Some embodiments may be set to analyze a certain number of tokens before or after a candidate token by default when determining whether one or more tokens of the set of context tokens match with a context pattern, as described elsewhere in this disclosure. For example, some embodiments may obtain a phrase "analysis of workup for the patient identified '532176' is complete." If a default radius of the context range is equal to two, some embodiments may associate the phrase "patient identified" as a first set of context tokens and associate the phrase "is complete" as a second set of context tokens. The context range may be a pre-determined range of tokens. For example, the pre-determined range may be integer such as one or an integer greater than one, such as two, three, four, five, ten, or some other number.

Some embodiments may associate the candidate token with a data label based on the set of patterns, as indicated by block 312. Some embodiments may associate a set of candidate tokens with a data label based on a determination that the set of candidate tokens match with an inclusive regex pattern. For example, some embodiments may determine that the token "123-123-1234" is sensitive based on a determination that the token matches with a first inclusive regex pattern "([0-9]+(−[0-9]+)+)" associated with the "sensitive" label. Some embodiments may first exclude one or more candidate tokens from being associated with the data label based on a determination that the one or more candidate tokens match with an exclusive regex pattern. For example, some embodiments may determine that the token "101-101-1010" is not to be labeled as "sensitive" based on a determination that the token matches with the exclusive regex pattern "[0-9]+(101(–101)+)051-1010."

As described elsewhere in this disclosure, some embodiments may analyze context tokens surrounding a set of candidate tokens when determining whether or not to associate the set of candidate tokens with a data label. For example, some embodiments may receive the sequence of tokens "person prescribes med1 to patID230 for three days" as a sequence of tokens for analysis. Some embodiments may iteratively proceed through the sequence of tokens and, at a certain iteration, select the token "patID230" as a candidate token. When selecting the token "patID230" as the candidate token, some embodiments may also select the tokens "prescribed," "med1," and "to" as a first set of context tokens of the candidate token and may also select the tokens "for," "three," and "days" as a second set of context tokens.

Some embodiments may determine that a context token of a candidate token matches with a context pattern associated with a data label and indicate that a candidate token may be labeled with the data label. In some embodiments, a determination that a context pattern matches with a context token may override an indication that a candidate token is not to be labeled with a data label based on a determination that the candidate token matches with an exclusive regex pattern or another pattern. For example, some embodiments may select a candidate token "xz215" and determine a corresponding set of context tokens "23 k 12q 541." Some embodiments may determine that the candidate token matches with an exclusive regex pattern "[a-zA-Z]+215" associated with a first data label. Some embodiments may then determine that the corresponding set of context tokens includes a context token "23 k," which matches with a context pattern associated with the first data label. Based on a determination that the context token "23 k" matches with the context pattern, some embodiments may determine whether the candidate token "xz215" matches the inclusive regex pattern associated with the first label. Based on a determination that the candidate token matches with an inclusive regex pattern associated with the first label, some embodiments may associate the candidate token with the first data label.

Some embodiments may select a context token for consideration when generating a pattern based on a neural network or other machine learning model output. For example, some embodiments may provide a neural network with the candidate token, where providing the neural network with the candidate token may include providing the neural network with an embedding vector generated based on the candidate token. Some embodiments may then determine context position scores for tokens surrounding the candidate token. For example, some embodiments may assign the values "10," "2," and "5," respectively, to the three tokens surrounding a candidate token. Some embodiments may then select the context token based on a determination that the context position score of the context token is greatest. For example, based on the values "10," "2," and "5," being generated from the tokens "initial," "tertiary," and "secondary," respectively, some embodiments may select the token "initial" as a context token.

Some embodiments may determine whether the candidate token has been incorrectly labeled, as indicated by block 320. Some embodiments may determine that a candidate token has been incorrectly labeled during a training or testing operation. During a training operation, some embodiments may receive sequences of text that may be analyzed, where tokens of the sequence may have been already classified as sensitive data or may have been otherwise labeled with one or more labels. For example, some embodiments may obtain a document comprising a plurality of sentences during a training operation. Some embodiments may then proceed through the body of the document until it encounters the phrase "estimated return on investment by client XYZ-ABCD yields no anomalies." Some embodiments may select the token "XYZ-ABCD" as a candidate token. Some embodiments may label the candidate token as a sensitive token based on using a set of patterns using one or more operations of a rules-based system described in this disclosure. Some embodiments may then receive feedback in the form of a failure during a testing operation that indicates that a known label associated with the candidate token was not associated with the candidate token by the rules-based system.

Some embodiments may receive feedback from a user indicating incorrect labeling. For example, the feedback may indicate that a candidate token has been associated with a data label with which the candidate token should not be associated. Alternatively, the feedback may indicate that a candidate token has not been associated with a data label with which the candidate token should have been associated with. For example, some embodiments may receive a feedback message from a client-side computing device operated by a user that indicates that a selected token has been incorrectly labeled as sensitive data. The client-side computing device may present the user with the option to highlight a set of candidate tokens or otherwise interact with a UI element that visually indicates the set of candidate tokens. A UI screen of the client-side computing device may include a UI element that, when interacted with, may cause the client-side computing device to send a feedback message indicating that the highlighted or otherwise visually indicated set of candidate tokens are incorrectly labeled. For example, a client-side computer device may send a feedback message to a server as an HTTPS request. In some embodiments, the feedback message may indicate a set of tokens representing candidate tokens and an array of categories indicating labels that were not assigned to a corresponding candidate token by a rules-based system, where the set of tokens should have been assigned to the corresponding candidate token by the rules-based system.

Based on a determination that the candidate token is incorrectly labeled, operations of the process 300 may proceed to operations described by block 326. Otherwise, operations of the process 300 may proceed to operations described by block 308 to perform operations based on another candidate token.

Some embodiments may update a token sequence collection based on context tokens surrounding the candidate token, as indicated by block 326. As described elsewhere in this disclosure, some embodiments may update an inclusive or exclusive set of regex patterns or other patterns based on feedback or other indications of an incorrectly labeled candidate token. For example, some embodiments may update a collection of token sequences, where each token sequence may represent a training set or testing set used to determine one or more regex patterns to use as exclusive or inclusive patterns. Each token sequence of the token sequence collection may include a false positive token that is not associated with a sensitive data label. As used in this disclosure, a false positive token may include a token that has been associated with a data label using a pattern but is determined to not be associated with the data label based on feedback or training data.

In some embodiments, the tokens or tokens sequences of a collection of token sequences may represent a specific category of tokens. For example, a first token sequence of a token sequence collection may be associated with a "sensitive" data label or include a set of context tokens surrounding a token associated with the "sensitive" data label. As described elsewhere in this disclosure, some embodiments may determine whether a set of tokens is sensitive or not sensitive based both on the tokens themselves as well as context tokens surrounding those tokens. After receiving feedback indicating that a sequence of tokens is not sensitive, some embodiments may store both the context tokens of a sequence of tokens and the sequence of tokens previously determined as being sensitive. For example, some embodiments may receive a feedback message indicating a first token "XYZ-0000" is not sensitive data. Some embodiments may determine that the first token matches with an inclusive regex pattern associated with a "sensitive" data label and perform operations to update a set of exclusive regex patterns to include the context patterns of the token "XYZ-0000." For example, based on a determination that the three context tokens before the token "XYZ-0000" are "example," "number," and "is," some embodiments may add a new token sequence that includes the phrase "example number is" as a token sequence. Some embodiments may also indicate that text sequences including this token sequence should not be assigned with the "sensitive" data label.

Some embodiments may use token-specific methods to rank candidate context tokens and determine whether or not to store the candidate context tokens as context tokens of a token sequence collection. For example, some embodiments may obtain a corpus and, for each document of the corpus, determine a term frequency of the context tokens of the term frequency. Some embodiments may then use the term frequency calculations to determine a term-frequency-inverse-document-frequency (TF-IDF) score for each token in one or more documents based on counts of terms of documents in the corpus. Some embodiments may then select one or more context tokens by determining whether a TF-IDF score for a candidate context token satisfies a TF-IDF threshold. Based on a determination that the TF-IDF score of the candidate context token satisfies the TF-IDF threshold, some embodiments select the candidate context token as a candidate token. For example, based on a determination that a normalized TF-IDF score of a candidate context token satisfies a TF-IDF threshold equal to 0.3, some embodiments may select the candidate context token as a context token.

Furthermore, some embodiments may use a machine learning model or statistical model to determine relevance scores based on a set of surrounding tokens of a candidate token, where each respective relevance score is assigned to respective token of the surrounding tokens. A relevance score may be based on one or more parameters of a specific user or category assigned to a group of users. For example, a machine learning model may assign different relevance scores for a same token based on differences in the user-specific parameters.

Some embodiments may update the set of patterns based on the updated token sequence collection to include new patterns, as indicated by block 330. Some embodiments may update a set of patterns by generating a set of patterns using a rules-based system or a machine learning model and then adding the generated set of patterns to the set of patterns. For example, after updating a token sequence collection with an indicated set of token sequences, some embodiments may provide each sequence of the indicated set of token sequences to an abstractive neural network. The abstractive neural network may generate a plurality of candidate patterns based on the provided token sequences such that each respective candidate pattern may match with a respective token sequence of the indicated set of token sequences.

Some embodiments may prevent the use of a pattern associated with a data label or may prevent the updating of a set of patterns associated with the data label until a number of token sequences in a token sequence collection matching the pattern satisfy a count threshold. For example, some embodiments may determine whether a count of a subset of token sequences in a token sequence collection associated with a "sensitive" data label is greater than a count threshold, where a particular pattern matches the subset of token sequences. If the number of the subset of token sequences is greater than the count threshold, some embodiments may then permit the use of the pattern as part of an exclusive set of patterns or an inclusive set of patterns. The count threshold may be a five, ten, twenty, 100, or another number.

Some embodiments may prune at least one new pattern of the new patterns based on matches with token sequences representing mislabeled tokens, as indicated by block 340. As described elsewhere, some embodiments may use a collection of token sequences associated with a data label or set of data labels to test whether proposed new regex patterns would mislabel any patterns. For example, some embodiments may determine that an exclusive regex pattern matches with an updated token sequence collection that is labeled or is otherwise associated with an inclusive regex pattern. In response, some embodiments may remove the new pattern from the exclusive set of regex patterns based on a determination that the match represents a mislabeled set of tokens.

In some embodiments, the sets of patterns used to associate a set of tokens with a data label may be pruned based on an associated set of accuracy scores or other indicators of pattern quality, where a pruned pattern may include an exclusive pattern or an inclusive pattern. For example, each respective pattern of an exclusive set of patterns may be associated with a respective exclusive accuracy score that indicates how accurate they are with respect to feedback messages or other indicators of correct data labels. For example, some embodiments may determine a respective accuracy for each respective exclusive pattern by determining a count of matches between the respective exclusive pattern and any token sequence indicated to be associated with the sensitive data label, where a greater count value may result in a lesser accuracy score. The count of matches may be indicated by feedback messages or other types of indicators associating tokens with data labels, where the indicators may be provided from a training dataset, a validation dataset, from users in real time via a set of UIs, etc. Similarly, some embodiments may determine a respective inclusive accuracy score for each respective inclusive pattern by determining a count of matches between the inclusive pattern and any token sequence indicated to be associated with the sensitive data label, where a greater count value may result in a greater accuracy score. Some embodiments may obtain the indicated token sequences from a set of test tokens used for rule testing operations.

Some embodiments may then use accuracy scores associated with exclusive or inclusive patterns to prune or otherwise remove patterns. For example, some embodiments may obtain a pre-determined confidence threshold representing an accuracy, such as a confidence threshold greater than 50%, such as 75%, 80%, 90%, or some other confidence threshold. Some embodiments may then determine a confidence score for a pattern based on both accuracy scores of the pattern itself and for accuracy scores of related patterns, where patterns may be related to each other if they match with a shared token or token sequence. Furthermore, some embodiments may determine that a pattern should be pruned from a set of exclusive patterns based on determined inaccuracies of the pattern. For example, some embodiments may determine a confidence score for an exclusive pattern based on an accuracy score for the exclusive pattern that matches with a token sequence and an accuracy for an inclusive pattern that matches with the token sequence. Some embodiments may then determine the confidence score as being equal to or otherwise including an average score of the two accuracy scores if the accuracy scores represent an incorrect count. Alternatively, some embodiments may set a confidence score to be equal to a minimum accuracy score of a set of accuracy scores.

Some embodiments may update a learning model based on the updated patterns, as indicated by block 350. As described elsewhere in this disclosure, some embodiments may use a learning model to determine whether or not to label a set of tokens as "sensitive." Some embodiments may update a learning model used to generate an inclusive pattern, or exclusive pattern based on feedback messages indicating that one or more generated patterns did not correctly label a set of tokens. For example, some embodiments may determine that a generated inclusive pattern "red" that was generated based on an update to a token sequence collection did not generate an acceptable inclusive pattern that correctly indicated that all of the tokens in the token sequence were "sensitive." Some embodiments may update a learning parameter of the machine learning model by retraining the machine learning model based on the updated token sequences of an updated set of patterns, such as an updated set of exclusive regex patterns or an updated set of inclusive regex patterns.

The operations of each method presented in this disclosure are intended to be illustrative and non-limiting. It is contemplated that the operations or descriptions of FIG. 3 may be used with any other embodiment of this disclosure. In addition, the operations and descriptions described in relation to FIG. 3 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated (and described below) is not intended to be limiting.

In some embodiments, the operations described in this disclosure may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a non-transitory, machine-readable medium, such as an electronic storage medium. Furthermore, the use of the term "media" may include a single medium or combination of multiple media, such as a first medium and a second medium. The processing devices may include one or more devices configured through hardware, firmware, and/or software to be specifically designed for execution of one or more of the operations of the methods. For example, it should be noted that any of the devices or equipment discussed in relation to FIGS. 1-2 could be used to perform one or more of the operations in FIG. 3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. For example, the set of databases may include a relational database such as a PostgreSQL™ database or MySQL database. Alternatively, or in addition, the set of databases 130 or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or LTE network), a cable network, a public switched telephone network, or other types of communications networks or combinations of communications networks. The network 150 may include one or more communications paths, such as Ethernet, a satellite path, a fiber-optic path, a cable path, a path that supports Internet communications (e.g., IPTV), free-space connections (e.g., for broadcast or other wireless signals), WiFi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 124-127 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 124-127 described herein is for illustrative purposes, and is not intended to be limiting, as any of subsystems 124-125 may provide more or less functionality than is described. For example, one or more of subsystems 124-127 may be eliminated, and some or all of its functionality may be provided by other ones of subsystems 124-127. As another example, additional subsystems may be programmed to perform some or all of the functionality attributed herein to one of subsystems 124-127.

With respect to the components of computing devices described in this disclosure, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Further, some or all of the computing devices described in this disclosure may include a user input interface and/or user output interface (e.g., a display) for use in receiving and displaying data. In some embodiments, a display such as a touchscreen may also act as user input interfaces. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, indicated otherwise, updating an item may include generating the item or modifying an existing time. Thus, updating a record may include generating a record or modifying the value of already-generated value.

Enumerated Embodiments

The present techniques will be better understood with reference to the following enumerated embodiments:

1. A method comprising: generating a first set of patterns indicating a data label; associating a candidate token of a text sequence with the data label by removing a first set of tokens from the text sequence based on a match of the first set of tokens with a token of a second set of patterns and selecting the candidate token from other tokens of the text sequence based on a match between the candidate token and a token of the second set of patterns; in response to receiving an indicator that the candidate token is incorrectly associated with the data label, updating a token sequence collection to comprise the candidate token and a context token; updating the second set of patterns with new patterns that match the candidate token and the context token; and removing a first pattern from the second set of patterns based on a determination that the first pattern matches with a token sequence associated with a set of test tokens.

2. The method of embodiment 1, wherein each pattern of the first set of patterns selects each token of a set of test tokens associated with the data label.

3. A method comprising: generating inclusive regex patterns based on sensitive tokens associated with a sensitive data label, wherein each pattern of the inclusive regex patterns matches with at least one token of the sensitive tokens; associating a candidate token of a document with the sensitive data label by removing false positive tokens with exclusive regex patterns from the document and selecting the candidate token from other tokens of the document based on a match between the candidate token and an inclusive regex pattern; in response to receiving a feedback message from a client-side computing device indicating that the candidate token is incorrectly associated with the sensitive data label, updating a token sequence collection to comprise an additional sequence, the additional sequence comprising the candidate token and context tokens surrounding the candidate token; updating the exclusive regex patterns with new patterns that match the additional sequence, wherein, for each respective pattern of the new patterns, a count of sequences of the token sequence collection that matches with the respective pattern is greater than a threshold; and pruning the exclusive regex patterns by removing an exclusive pattern of the exclusive regex patterns based on a determination that the exclusive pattern matches with a token sequence associated with the sensitive tokens.

4. A method comprising: obtaining a first set of patterns indicating a data label, wherein each respective pattern of the first set of patterns matches with a respective token of a set of test tokens associated with the data label; associating a set of candidate tokens of a text sequence with the data label by removing a first set of tokens from the text sequence based on a match of the first set of tokens with a token of a second set of patterns and selecting the set of candidate tokens from other tokens of the text sequence based on a match between the set of candidate tokens and a pattern of the second set of patterns; in response to receiving an indicator that the set of candidate tokens is incorrectly associated with the data label, updating a token sequence collection to comprise the set of candidate tokens and a context token, wherein the context token is within a predetermined range of tokens between the context token and a candidate token of the set of candidate tokens; updating the second set of patterns with new patterns that match the set of candidate tokens and the context token; and removing a first pattern from the second set of patterns based on a determination that the first pattern matches with a token sequence associated with the set of test tokens.

5. The method of any embodiment of embodiments 1 to 4, wherein the context token is in a same sentence as the candidate token.

6. The method of any embodiment of embodiments 1 to 5, wherein: the context token is a first context token; the token is a first token; and determining that the first token matches with a pattern of the first set of patterns comprises determining that a second context token satisfies the pattern of the first set of patterns, wherein the second context token is in a same sentence as the first token.

7. The method of any embodiment of embodiments 1 to 6, further comprising: obtaining a corpus comprising the text sequence; determining a term frequency of the context token; determining a term-frequency-inverse-document-frequency score of the context token based on the term frequency of the context token and a count of documents in the corpus; determining whether the term-frequency-inverse-document-frequency score satisfies a threshold; and based on a determination that the term-frequency-inverse-document-frequency score satisfies the threshold, selecting a candidate context token associated with the term-frequency-inverse-document-frequency score as the candidate token.

8. The method of any embodiment of embodiments 1 to 7, wherein the context token is a first context token, and wherein removing the first set of tokens comprises: determining whether a second context token within a pre-determined number of tokens of the first set of tokens in the text sequence matches a pattern of the second set of patterns; and removing the first set of tokens based on a determination that the context token matches the pattern of the second set of patterns.

9. The method of any embodiment of embodiments 1 to 8, the operations further comprising: obtaining a set of surrounding tokens of the candidate token, wherein each token of the set of surrounding tokens is in a same sentence as the candidate token, and wherein the set of surrounding tokens comprises the context token; determining a respective relevance score for each respective token of the set of surrounding tokens; and selecting the context token based on a relevance score of the context token.

10. The method of any embodiment of embodiments 1 to 9, the operations further comprising: providing the token sequence collection to a machine learning model; and generating a candidate pattern based on the token sequence, wherein the candidate pattern matches each token sequence of the set of test tokens, and wherein the new patterns comprises the candidate pattern.

11. The method of any embodiment of embodiments 1 to 10, further comprising: providing the candidate token and context token to a neural network model to determine a neural network model output; and associating the candidate token with the data label based on the neural network model output.

12. The method of any embodiment of embodiments 1 to 11, wherein: the inclusive regex pattern is a first regex pattern; a second inclusive regex pattern of the inclusive regex patterns matches with the token sequence; the exclusive pattern is associated with an exclusive accuracy score indicating a count of matches between the exclusive pattern and any token sequence indicated to be associated with the sensitive data label by a first set of feedback messages; the inclusive regex pattern is associated with an inclusive accuracy score indicating a count of matches between the second inclusive regex pattern and any token sequence indicated as not associated with the sensitive data label by a second set of feedback messages; and removing the exclusive pattern comprises: determining a confidence score based on the exclusive accuracy score and the inclusive accuracy score; and in response to a determination that the confidence score satisfies a confidence threshold, removing the exclusive pattern.

13. The method of any embodiment of embodiments 1 to 12, wherein generating the inclusive regex patterns comprises: generating a set of vectors based on the candidate token; and providing the set of vectors to a neural network to generate the inclusive regex patterns.

14. The method of any embodiment of embodiments 1 to 13, further comprising: determining, for each respective pattern of the inclusive regex patterns, a respective count of matches between the respective pattern and sets of tokens in a corpus; selecting a regex pattern of the inclusive regex patterns based on a determination that the selected regex pattern has a greatest count of matches; and storing the selected regex pattern in a record of general regex patterns.

15. The method of any embodiment of embodiments 1 to 14, wherein: receiving the feedback message comprises receiving the feedback message from the client-side computing device; the client-side computing device presents, in a user interface, the candidate token, a highlight of the candidate token, and a user interface element; and an interaction with the user interface element causes the client-side computing device to send the feedback message to the client-side computing device.

16. The method of any embodiment of embodiments 1 to 15, wherein updating the token sequence collection comprises: providing a neural network with the candidate token to determine context position scores for tokens surrounding the candidate token; and selecting the context token based on a determination that a context position score of the context token is greatest.

17. The method of any embodiment of embodiments 1 to 16, wherein updating the second set of patterns comprises: determining whether a count of token sequences of the token sequence collection is greater than ten; and in response to a determination that the count of token sequences is greater than ten, updating the second set of patterns.

18. The method of any embodiment of embodiments 1 to 17, the operations further comprising: obtaining an image; obtaining an orientation direction from a template; determining whether a distance between a first and second token in the orientation direction satisfies each other based on their orientation; and determining that the first and second tokens are part of the set of candidate tokens.

19. The method of any embodiment of embodiments 1 to 18, wherein removing the first pattern of the second set of patterns comprises: determining whether a candidate token that is not labeled with the data label matches with a pattern of the second set of patterns; and in response to a determination that the candidate token that is not labeled with the data label matches with the pattern of the second set of patterns, removing the first pattern of the second set of patterns.

20. The method of any embodiment of embodiments 1 to 19, wherein the pre-determined range is less than or equal to ten.

21. The method of any embodiment of embodiments 1 to 20, wherein updating the second set of patterns comprises using a machine learning model to generate the new patterns based on the context token, wherein the first pattern comprises the context token, and wherein a second pattern of the new patterns does not comprise the context token.

22. One or more tangible, non-transitory, machine-readable media storing instructions that, when executed by one or more processors, effectuation operations comprising those of any of embodiments 1-21.

23. A system comprising: one or more processors; and memory storing computer program instructions that, when executed by the one or more processors, cause the one or more processors to effectuate operations comprising those of any of embodiments 1-21.

What is claimed is:

1. A method for updating a rules-based model for detecting sensitive data by updating and pruning regex patterns comprising:

generating inclusive regex patterns based on sensitive tokens associated with a sensitive data label, wherein each pattern of the inclusive regex patterns matches with at least one token of the sensitive tokens;

associating a candidate token of a document with the sensitive data label by removing false positive tokens with exclusive regex patterns from the document and selecting the candidate token from other tokens of the document based on a match between the candidate token and a first inclusive regex pattern of the inclusive regex patterns that does not indicate context tokens surrounding the candidate token in the first inclusive regex pattern;

in response to receiving a feedback message from a client-side computing device indicating that the candidate token is incorrectly associated with the sensitive data label, updating a token sequence collection to comprise an additional sequence, the additional sequence comprising the candidate token and a first set of context tokens;

updating the exclusive regex patterns by, for each respective pattern of new patterns that match the additional sequence, (1) determining a respective result indicating that a count of sequences of the token sequence collection that matches with the respective pattern is greater than a threshold and (2) updating the exclusive regex patterns with the respective pattern in response to the determining of the respective result; and pruning the exclusive regex patterns by removing an exclusive pattern of the exclusive regex patterns based on a determination that (i) the exclusive pattern matches with a token sequence associated with the sensitive tokens and (ii) a confidence threshold is satisfied by a confidence score derived from (a) an exclusive accuracy score indicating a count of matches between the exclusive pattern and any token sequence indicated to be associated with the sensitive data label by a first set of feedback messages and (b) an inclusive accuracy score indicating a count of matches between a second inclusive regex pattern of the inclusive regex patterns and any token sequence indicated as not associated with the sensitive data label by a second set of feedback messages.

2. The method of claim 1, wherein generating the inclusive regex patterns comprises:

generating a set of vectors based on the candidate token; and providing the set of vectors to a neural network to generate the inclusive regex patterns.

3. The method of claim 1, further comprising:

determining, for each respective regex pattern of the inclusive regex patterns, a respective count of matches between the respective regex pattern and sets of tokens in a corpus;

determining a selected regex pattern of the inclusive regex patterns based on a determination that the selected regex pattern has a greatest count of matches; and storing the selected regex pattern in a record of general regex patterns.

4. The method of claim 1, wherein:

receiving the feedback message comprises receiving the feedback message from the client-side computing device;

the client-side computing device presents, in a user interface, the candidate token, a highlight of the candidate token, and a user interface element; and an interaction with the user interface element causes the client-side computing device to send the feedback message to the client-side computing device.

5. One or more tangible, non-transitory, machine-readable media storing instructions that, when executed by one or more processors, effectuate operations comprising:

obtaining a first set of patterns indicating a data label, wherein each respective pattern of the first set of patterns matches with a respective token of a set of test tokens associated with the data label;

associating a set of candidate tokens of a text sequence with the data label by removing a first set of tokens from the text sequence based on a match of the first set of tokens with a token of a second set of patterns and selecting the set of candidate tokens from other tokens of the text sequence based on a match between the set of candidate tokens and a pattern of the first set of patterns;

in response to receiving an indicator that the set of candidate tokens is incorrectly associated with the data label, updating a token sequence collection to comprise an additional sequence comprising the set of candidate tokens and a context token, wherein the context token is (1) within a pre-determined range of tokens of at least one candidate token of the set of candidate tokens and (2) separated from any candidate token of the set of candidate tokens by at least one additional token;

updating the second set of patterns by, for each respective pattern of new patterns that match the additional sequence, (1) determining a respective result indicating that a threshold is satisfied by a count of sequences of the token sequence collection that matches with the respective pattern and (2) updating the second set of patterns with the respective pattern based on the respective result; and removing a first pattern from the second set of patterns based on a determination that (i) the first pattern matches with a token sequence associated with the set of test tokens and (ii) a confidence threshold is satisfied by a confidence score derived from (a) a first accuracy score indicating a count of matches between the first pattern and token sequences indicated to be associated with the data label by a first set of indicators and (b) a second accuracy score indicating a count of matches between a pattern of the first set of patterns and token sequences indicated as not associated with the data label by a second set of indicators.

6. The one or more media of claim 5, wherein updating the token sequence collection comprises:

providing a first machine learning model with the set of candidate tokens to determine a set of context position scores for tokens surrounding the set of candidate tokens;

selecting the context token by determining that a context position score of the context token is greatest of the set of context position scores; and generating the new patterns by providing a second machine learning model with the selected context token.

7. The one or more media of claim 5, wherein updating the second set of patterns comprises updating the second set of patterns based on a determination that the count of token sequences is greater than ten.

8. The one or more media of claim 5, the operations further comprising:

obtaining an image;

obtaining an orientation direction from a template;

determining whether a distance between a first token and a second token in the orientation direction satisfies each other based on their orientation; and determining that the first token and the second token are part of the set of candidate tokens.

9. The one or more media of claim 5, wherein removing the first pattern of the second set of patterns comprises:

determining that a first candidate token that is not labeled with the data label matches with a second pattern of the second set of patterns; and in response to the first candidate token matching with the second pattern of the second set of patterns, removing the first pattern of the second set of patterns.

10. The one or more media of claim 5, wherein a token count of the pre-determined range of tokens is less than or equal to ten.

11. The one or more media of claim 5, wherein updating the second set of patterns comprises using a machine learning model to generate the new patterns based on the context token, wherein the first pattern comprises the context token, and wherein a second pattern of the new patterns does not comprise the context token.

12. A system comprising:

one or more processors; and memory storing computer program instructions that, when executed by the one or more processors, cause the one or more processors to effectuate operations comprising:

generating a first set of patterns indicating a data label, wherein each pattern of the first set of patterns selects each token of a set of test tokens associated with the data label;

associating a candidate token of a text sequence with the data label by removing a first set of tokens from the text sequence based on a match of the first set of tokens with a token of a second set of patterns and selecting the candidate token from other tokens of the text sequence by determining a match between the candidate token and a matching pattern of the first set of patterns;

in response to receiving an indicator that the candidate token is incorrectly associated with the data label, updating a token sequence collection to comprise an additional sequence comprising the candidate token and a context token, wherein the context token is (1) within a pre-determined range of tokens of at least one candidate token and (2) separated from the at least one candidate token by at least one additional token;

updating the second set of patterns by, for each respective pattern of new patterns that match the additional sequence, (1) determining a respective result indicating that a threshold is satisfied by a count of sequences of the token sequence collection that matches with the respective pattern and (2) updating the second set of patterns with the respective pattern based on the respective result; and removing a first pattern from the second set of patterns based on a determination that (i) the first pattern matches with a token sequence associated with the set of test tokens and (ii) a confidence threshold is satisfied by a confidence score derived from (a) a first accuracy score indicating a count of matches between the first pattern and token sequences indicated to be associated with the data label by a first set of indicators and (b) a second accuracy score indicating a count of matches between a pattern of the first set of patterns and token sequences indicated as not associated with the data label by a second set of indicators.

13. The system of claim 12, wherein the context token is in a same sentence as the candidate token.

14. The system of claim 12, wherein removing the first set of tokens comprises removing the first set of tokens based on a determination that a second context token, in a same sentence as the token, satisfies at least one pattern of the first set of patterns.

15. The system of claim 12, further comprising:

obtaining a corpus comprising the text sequence;

determining a term frequency of the context token;

determining a term-frequency-inverse-document-frequency score of the context token based on the term frequency of the context token and a count of documents in the corpus; and based on a determination that the term-frequency-inverse-document-frequency score satisfies a threshold, selecting a candidate context token associated with the term-frequency-inverse-document-frequency score as the candidate token.

16. The system of claim 12, wherein the context token is a first context token, and wherein removing the first set of tokens comprises removing the first set of tokens based on a determination that a second context token, within a predetermined number of tokens of the first set of tokens in the text sequence, matches at least one pattern of the second set of patterns.

17. The system of claim 12, the operations further comprising:

obtaining a set of surrounding tokens of the candidate token, wherein each token of the set of surrounding tokens is in a same sentence as the candidate token, and wherein the set of surrounding tokens comprises the context token;

determining a respective relevance score for each respective token of the set of surrounding tokens; and selecting the context token based on a relevance score of the context token.

18. The system of claim 12, the operations further comprising:

providing the token sequence collection to a machine learning model; and generating a candidate pattern based on the token sequence, wherein the candidate pattern matches each token sequence of the set of test tokens, and wherein the new patterns comprise the candidate pattern.

19. The system of claim 12, further comprising:

providing the candidate token and the context token to a neural network model to determine a neural network model output; and associating the candidate token with the data label based on the neural network model output.

* * * * *